(12) United States Patent (10) Patent No.: US 8,689,232 B2
Monnie et al. (45) Date of Patent: *Apr. 1, 2014

(54) OBJECT SYNCHRONIZATION IN SHARED OBJECT SPACE

(75) Inventors: David J. Monnie, Portland, OR (US);
Robert Bretl, Portland, OR (US)

(73) Assignee: Pivotal Software, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/435,633

(22) Filed: Mar. 30, 2012

(65) Prior Publication Data

US 2012/0191922 A1 Jul. 26, 2012

Related U.S. Application Data

(63) Continuation of application No. 11/982,564, filed on Nov. 2, 2007, now Pat. No. 8,171,491, which is a continuation of application No. 10/690,690, filed on Oct. 21, 2003, now abandoned.

(51) Int. Cl.
*G06F 9/44* (2006.01)
*G06F 17/30* (2006.01)

(52) U.S. Cl.
USPC .............................................. 719/310; 707/8

(58) Field of Classification Search
None
See application file for complete search history.

(56) References Cited

U.S. PATENT DOCUMENTS 6,330,709 B1 * 12/2001 Johnson et al. ............... 717/100
2003/0097360 A1 * 5/2003 McGuire et al. .................. 707/8
2004/0059759 A1 * 3/2004 Doan et al. .................... 707/205

\* cited by examiner

*Primary Examiner* — Andy Ho
*Assistant Examiner* — Abdou Seye
(74) *Attorney, Agent, or Firm* — Fish & Richardson P.C.

(57) ABSTRACT

A shared object space in a computer system provides synchronized access to data objects accessible to a plurality of concurrently running applications in the computer system. The shared object space is allocated a portion of memory of the computer system and concurrently running applications are able to connect to the shared object space. The shared object space restricts simultaneous access to data objects by the concurrently running applications by associating locks with the data objects.

20 Claims, 9 Drawing Sheets

OBJECT SYNCHRONIZATION IN SHARED OBJECT SPACE

CROSS-REFERENCE TO RELATED APPLICATIONS

This application is a continuation of U.S. patent application Ser. No. 11/982,564 entitled "Object Synchronization in Shared Object Space" and filed on Nov. 2, 2007, now U.S. Pat. No. 8,171,491 which is a continuation of U.S. patent application Ser. No. 10/690,690, filed Oct. 21, 2003, now abandoned, both which are hereby incorporated by reference herein.

BACKGROUND

The present invention relates to a system for synchronizing shared objects among multiple applications each running inside its own virtual machine.

Computer hardware and storage media can only create, store, and process binary information, i.e. information written using only two digits, "0" and "1". A compact disc, for example, has a surface subdivided into tiny sections that are either pitted (1) or not pitted (0) such that a laser can detect the presence or absence of pits. Similarly, microprocessors have inputs and outputs to which a reference voltage either is (1) or is not (0) present. (Microprocessors repeatedly measure the voltage at each input and output at regular intervals, or cycles—hence the speed of a processor is expressed in cycles per second, or "Hertz.") Accordingly, any computer program, as well as any data used in that computer program, must first be expressed in binary code for a computer to run the program or process the data.

Though binary code is conceptually simple, its use to perform computerized tasks introduces two drawbacks. First, binary code is a relatively inefficient way to express information. As a simple example, the number "100" in decimal notation is expressed as "1100100" in binary code, and therefore must at a minimum occupy seven "pits" on a compact disc and/or occupy either a single input of a processor for seven cycles (if entered serially) or seven inputs for one cycle (if entered in parallel). In technical terms, the space that a piece of information occupies, or alternatively the number of time cycles a piece of information occupies, is referred to in "bits." That is to say, the number "100" is a 7-bit number because it takes seven digits to express in binary code. The number "101" is also a 7-bit number, coded as 1100101, as is every number between "64" (1000000) and "127" (1111111).

In computer applications, binary code is even more inefficient because computerized information is, by convention, typically expressed in multiples of 8 bits, e.g. 8-bit, 16-bit, 24-bit, etc. The reason for this convention is that a computer processing or storage device has no physical way of distinguishing when one number ends and another number begins. Accordingly, the convention is to write a program that specifies the bit-rate, i.e. the number of bits that each piece of data processed in the program will occupy. If a program is written in 8-bit code, for example, every piece of data occupies eight bits, e.g. the number 0 is coded as 00000000, the number 1 is coded as 00000001, and the number 255 is coded as 11111111. In 8-bit code, therefore, every piece of data has a value between 0 and 255 and every piece of data occupies 8 bits even if it could theoretically be represented by a single bit. If a program requires that any piece of data take on a value greater than 255, the bit-rate for the program must be increased incrementally to 16-bit, 24-bit, etc. as appropriate.

A computer program operating in binary code may therefore use a tremendous amount of storage space and processor cycles, particularly when graphics are involved. For example, a photographic quality image is often coded at 24-bits for every pixel. If the image resolution is 2 million pixels, as is common with today's digital cameras, each image would occupy 48 million bits, or 4 Megabytes, where a byte is defined as 8 bits per byte (due to the convention of expressing binary code in multiples of 8 bits). Manipulating that image would similarly require 48 million cycles of processor time for each manipulation. The amount of storage space and processing time increases exponentially when manipulating video because the computer system must process and store many such images every second. In addition, there are many other computer applications that are at least as intensive as image processing. Applications of such intensity tend to slow considerably as data is "bottlenecked" in the computer system.

One way of minimizing the impact of the inefficiency of binary code has been to increase the amount of storage space and processing speed of computers. For example, personal computers sold commercially today offer up to 300 gigabytes (300 billion bytes) of hard drive storage, 4 gigabytes (4 billion bytes) of temporary memory storage, and processing speeds of over 4 gigahertz (4 billion cycles per second). Business computers, such those used in the motion picture industry are even faster and include more storage. In other words, as computer applications have demanded more storage space and processing time, the computers have become faster with higher storage capacity. Still, while these numbers are impressive, computer systems are not sufficiently fast as to eliminate all bottlenecks, and in fact, as computers become faster with more available storage, new applications are developed to take advantage of the improved technology so as to provide the need for even faster computers, even more storage space, etc.

Another way of minimizing the impact of the inefficiency of binary code is to write computer programs and applications as efficiently as possible. Thus there is always an emphasis on writing computer code that achieves its outcome in as few steps or calculations as possible. Similarly, a computer program should not be written in 24-bit code when only 8-bit code is required for the application, and the computer program may compress data when appropriate.

A second drawback of using binary code to perform computerized tasks is that it is impractical to write a computer program in binary code, particularly with complex programs. The first rudimentary computers, for example, were operated by mechanically toggling electrical switches between on and off states to enter a sequence of binary instructions. Computer programs simply specified the sequence of binary instructions to enter. This method was feasible so long as the program was no more than about a hundred instructions long. Beyond that point, programming directly in binary code became too complex, and programs too difficult to correct, or debug. Moreover, because the binary instructions were dependent upon the particular electrical circuitry of the computer processor and related hardware, the programmer was required to know in detail the particular architecture of the computer being used by the program.

To accommodate computer programs of increasing complexity, as well as to facilitate the introduction of personal computers into the marketplace, modern operating systems were developed. Early computer operating systems, such as Microsoft DOS, essentially acted as an interface with a computer's hardware so that a user could issue specific commands or instructions to the computer written in more ordinary language. The operating system would recognize the commands, and automatically issue the instructions to the computer in binary code. For example, in Microsoft DOS, entering the command "MEM" into the computer would result in the computer displaying the types and amounts of computer memory available. The person issuing the command did not need to know anything about binary code or the manner in which the command being entered produced the desired result. The user simply needed to either memorize or look up a set of commands in an instruction manual.

Further, early operating systems recognized simple programming languages, such as BASIC and FORTRAN, written in terms more intuitive than binary code. In these languages, commands such as WRITE, READ, LOOP, SET and other intuitive terms provided a means to write computer programs in a manner easily learned and perhaps more importantly, in a manner more easily readable when debugging the program. A simple computer program to calculate the area of a circle, for example, might have been written in BASIC approximately in this form:

1 10 PROGRAM 1 20 WRITE "This is a program to calculate the area of a circle." 30 WRITE "Please enter the radius of the circle" 40 READ R 50 SET A=.PI.*R{circumflex over ( )}2 60 WRITE "The area of the circle is" R 70 END In this example, after a person typed "RUN PROGRAM 1", the computer would execute the command lines in numerical sequence, whereby a person would be prompted to enter the value for a radius, defined as "R", after which the computer would square that value, multiply the squared value by pi and print out the computed area. Writing this same program in binary code not only would have required much more time and effort on the part of the programmer, but the programmer also would have had to know the technical specifications of the computer processor. Obviously, the introduction of operating systems along with intuitive programming languages was a boon to both consumers and computer programmers.

A number of such operating systems and programming languages became prevalent. For example, Apple Macintosh and Microsoft Windows operating systems improved (from a consumer's perspective) upon simple text-based operating systems such as DOS by allowing user to issue instructions to the computer using a point-and-click graphical interface displayed on a computer monitor. Computer applications, such as word processing programs, computer games, and a host of others took advantage of this functionality to provide products that could be used more intuitively through the graphical interface. Today, a host of operating systems are used, such as many versions of Microsoft Windows 9x, Macintosh OS, Linux, Windows NT, among others.

A wide variety of programming languages also became prevalent. At first, most new programming languages followed the model of the early FORTRAN language by structuring the programming language as a series of commands by which a programmer would issue instructions to a computer in a logical order. The most popular of these language types is a program called "C." The creation of "C" is considered by many to have marked the beginning of the modern age of computer languages. "C" successfully synthesized what had seemed to be conflicting attributes of several existing programming languages, adding new attributes to form a single, powerful structured language that also happened to be easy to learn. Moreover, it was a programmer's language. Prior to the development of "C", computer languages were generally designed either as academic exercises by engineers or designed by bureaucratic committees. "C", however, was developed by programmers, reflecting the way they approached the task of programming. As a result, "C" found wide and rapid acceptance in the programming community, attracting many followers who had near-religious zeal for it.

Once again, however, the increasing complexity of computer programs exposed an underlying flaw of "C" as well as its predecessors. Each of these programming languages requires that a program be written as a series of linear steps or instructions (with an occasional loop or branch thrown in). In fact, writing such a program is similar to constructing a geometric proof, and like a proof, once a program such as C or FORTRAN exceeds a certain number of steps (somewhere between 25,000 and 100,000 lines of code), the program becomes too complex write effectively.

Therefore a new approach to computer programming began to find acceptance in the programming community, commonly referred to as object-oriented programming. Object-oriented programming approaches a programming task in roughly the same way that a person's mind might approach that task—by abstracting a solution. Rather than defining a series of steps, or instructions by which a task could be accomplished, an object-oriented program focuses first on a program's data, defining classes of data and objects, where an object is a particular instance of a class. An object-oriented program still contains instructions, referred to as methods, which often are embedded within the classes or objects themselves. An example of a simple object oriented program that displays the volume of two boxes might look like this: 2 class Box {double width; double height; double depth; //display volume of a box void volume ( ){System.out.print ("Volume is"); System.out.println (width*height*depth);}} class BoxDemo {public static void main (String args[ ] {Box mybox1=new Box ( ) Box mybox2=new Box ( ); //assign values to mybox 1's variables mybox1.width=3 mybox1.height=20 mybox1.depth=15//assign values to mybox2's variables mybox2.width=3 mybox2.height=6 mybox2.depth=9//display volume of mybox1 mybox1.volume ( )//display volume of mybox2 mybox2.volume ( )

In this example program, a box class is first defined having the variables of width, height, and depth (the term "double" identifies the type of number that the variable is allowed to be). The box class also defines a method to display the volume of an object box of this class by multiplying width by height by depth. Once this class has been defined, the program defines a second class BoxDemo which includes two objects of the initial box class. The class BoxDemo then twice calls the method of the first box class for displaying the volume of a box, once to display the volume of mybox 1 and once to display the volume of mybox2.

Object oriented programming has quickly gained widespread popularity. One particularly popular object oriented language is called Java, which is the programming language used in the foregoing example (Java is a trademark of Sun Microsystems Inc.). The reason Java has become so popular is its versatility in defining classes and objects, as well as its ability for one class or object to call functions in other classes and objects as well as to reuse data in other objects simply by referencing the function or the data. In Java, therefore, it is very easy to create multiple variations of a defined class, to create new variations of an old class, and to reuse a method previously defined by one class in a new class. Parenthetically, another object oriented programming language that has become popular is C++, which expands C to include the functionality of both object oriented programming and the instruction oriented programming of C.

Java, like any other programming language relies upon an interface to convert the program to the required binary instructions. With Java, this interface is called a "Virtual Machine" (VM) because the interface behaves as if it were a computer unto itself. Every time a Java based computer application is initiated, the application initiates a VM to run the application. The Java VM will be described in much greater detail later in this specification, but several important principles will be introduced now. First, while the input to a Java VM is always the Java programming language, the output of a Java VM is customized to the particular platform, or operating system, that hosts the Java VM. In other words, every Java application must be customized to the host operating system so that the VM that it creates is capable of converting the Java programming language to the commands unique to the host operating system, which in turn issues the appropriate binary instructions to the computer.

Second, Java VMs are designed to be independent of one another. If two Java applications are running on the same computer, each application creates its own VM which is self sufficient, i.e. neither VM needs rely upon the VM of the other application. If one application should close, the other application will not be affected. This often becomes problematical, however. Recall that even with today's processors and storage devices, a computer's resources may still be strained by intensive applications. With multiple Java applications running simultaneously, each creating its own VM, system resources may be strained and slowdowns may result. In other words, there is often a trade off between the desired independence of multiple Java applications and the speed at which the applications may run.

Third, the creators of the Java VM, Sun Microsystems, emphasized uniformity of the Java VM with respect to all of the host operating systems. Thus, while the "guts" of each VM will of necessity be different across each platform, a user of a Java VM was not intended to be able to recognize any difference, seeing the same functionality regardless of the host platform. This, however, became problematical. Many operating systems offer unique features not available to other operating systems. Thus a business operating on Windows NT might desire to have a Java VM, and hence the Java application running the VM, take advantage of that unique functionality. The same would hold true for a user of a Macintosh or a Linux system, or a Windows 9x system, etc. Therefore, although Sun Microsystems's Java VM is uniform across all platforms, an industry has blossomed by which Java applications may be truly customized to a host operating system whereby the features of the host operating system are more fully exploited, and custom tailored to the particular needs of the business or person running the application.

This diversity among Java VMs tends to hinder the improvement of the Java VM and the programming language because many such improvements are tied to the particular species of Java VM upon which the improvement was developed. Many businesses may like the particular improvement, but dislike other aspects of the Java VM. In that instance, a business with its own custom or proprietary VM would have the options of buying the new VM with its perceived advantages and faults, or spend the time and resources to engineer its own VM, which it likes, to include the new improvement. Exacerbating this problem is that the new improvement may be proprietary, thus eliminating the second option.

What is desired then, is an improved system for implementing object-oriented computer applications that both efficiently allocates computer hardware resources among multiple computer applications running simultaneously on the same computer or network of computers, or among multiple threads of a single computer application running on a computer or network of computers, while also preserving the independence of multiple, simultaneous applications. What is further desired is such an improved system that is sufficiently flexible so as to be compatible not only with the diverse range of existing object-oriented computer applications, but also with object-oriented applications that are developed or modified in the future.

The foregoing and other objectives, features, and advantages of the invention will be more readily understood upon consideration of the following detailed description of the invention, taken in conjunction with the accompanying drawings.

SUMMARY

One method disclosed herein provides synchronized access to data objects accessible to a plurality of concurrently running applications in a computer system. According to the method, a process is launched in the computer system that allocates a portion of memory of the computer system for use as a shared object space, wherein the shared object space is configured to store data objects accessible by the plurality of concurrently running applications on the computer system when connected to the shared object space. A request is received at the process from at least one of the concurrently running applications on the computer system to connect to the shared object space and, in response to the received request, the concurrently running application is able to map the shared object space into an address space of the concurrently running application in response to the received request. The method also restricts simultaneous access to data objects stored in the shared object space by the concurrently running applications by associating locks with the data objects, wherein each lock comprises an identifier indicating whether a data object corresponding to the lock is free or is currently being accessed by one of the concurrently running applications.

DETAILED DESCRIPTION

Figure 1:
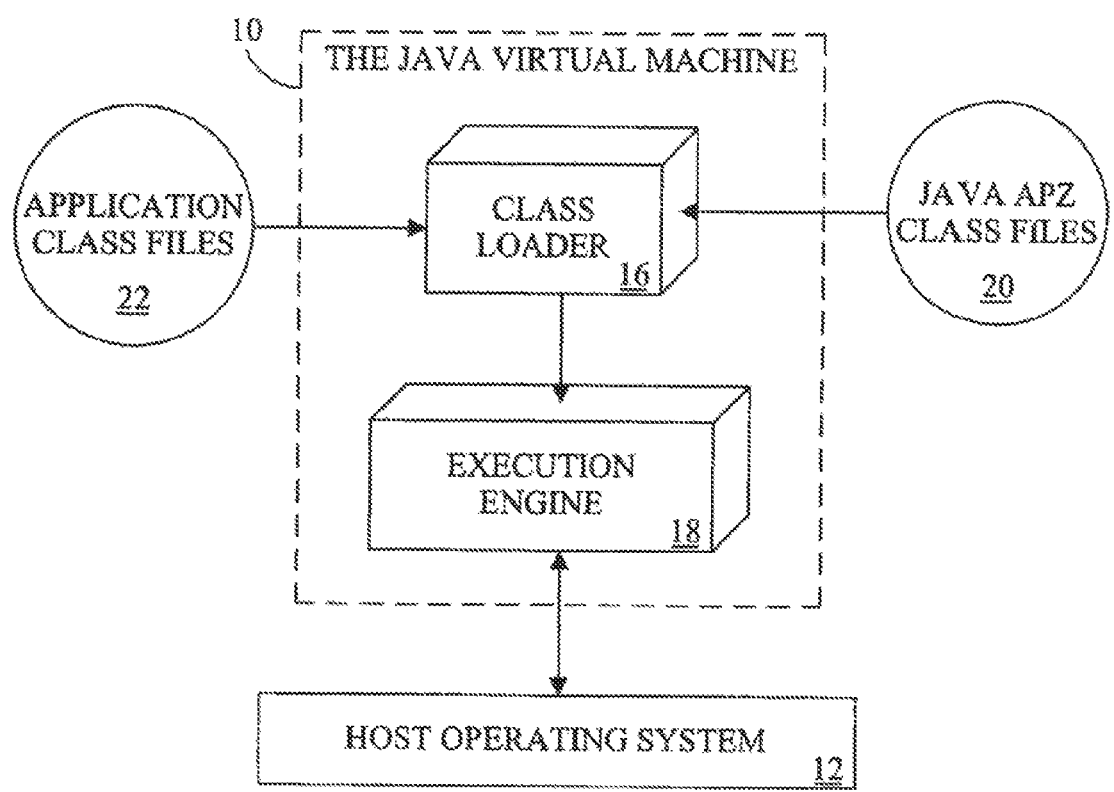
FIG. 1 is a simplified architectural schematic of an existing VM.

FIGS. 1-4B show a simplified architectural schematic of an existing Java VM 10, although it should be understood that other types of VMs besides Java may also have the features shown in FIGS. 1-4B. Referring specifically to FIG. 1, when a Java application is initiated on a host computer with a host operating system 12, the Java virtual machine (VM) 10 loads the application which may include a class loader 16 and an execution engine 18. Although FIG. 1 indicates a single class loader, in actuality, a Java VM may include multiple class loaders. Thus the class loader 16 may be considered a subsystem that may involve many class loaders. The Java VM 10 has a flexible class loader architecture that enables a Java application to load classes in custom ways.

Specifically, the class loader 16 may comprise a system class loader and one or more user-defined class loaders. The system class loader is a part of the Java VM implementation and loads classes, including the Java application programming interface (API) class files 20, in some default way and usually from the local disk of the host computer. As previously stated, the particular default manner in which the system class loader loads classes is specific to the particular VM implementation being used and may be customized. The term "system class loader" is sometimes referred to as a "primordial class loader", a "bootstrap class loader", or a "default class loader."

At run time, a Java application may also load application class files 22 in custom ways through user-defined class loaders, such as by downloading class files across a network. While the system class loader is an intrinsic part of the VM implementation, the user-defined class loaders are not. Instead, user-defined class loaders are written in Java, compiled to class files, loaded into the virtual machine, and instantiated just like any other object, becoming a part of the executable code of a running Java application. User defined class loaders enable a programmer to dynamically extend a Java application at run time. As the application runs, it can determine what extra classes are needed and load them through one or more user-defined class loaders. Because the user defined class loaders are written in Java, classes can be loaded in any manner expressible in the Java programming language.

For each class loaded by the virtual machine 10, the virtual machine 10 records which class loader loaded the class. When a loaded class refers to another class, the virtual machine 10 requests the referenced class from the same class loader that originally loaded the referencing class. For example, if the virtual machine 10 loads the class "Volcano" through a particular class loader, it will attempt to load any classes to which Volcano referred with the same class loader. In this way, Java's architecture enables a programmer to create multiple "name spaces" inside a single Java application. Each class loader in the executing Java application has its own name space, which is populated by the names of all the classes it has loaded.

The execution engine 18 executes instructions contained in the methods of loaded classes in "bytecode", essentially-Java's machine language. The Java specification describes what is to result from a given instruction retrieved from a Java method, but a programmer of a Java application determines the best way of achieving the result using software, hardware, or a combination of both. The execution engine 18 is an abstraction; Java is a programming language capable of simultaneously running multiple threads, i.e. distinct paths of execution, hence the execution of each thread can be considered an "instance" of the abstract execution engine 18. Thus at any given time, there may be multiple "instances" of the execution engine 18.

The execution engine 18 receives a bytecode stream of instructions in a thread and executes the thread one instruction at a time. The execution engine 18 executes the actions requested by each thread, and whenever intended by the Java application, sends instructions to the operating system in the code that the operating system recognizes. From time to time, the execution engine 18 might encounter an instruction that requests a method written in some other language than Java, referred to as a "native method." On such occasions, the execution engine 18 will attempt to invoke that native method by accessing native method libraries 36 through a native method interface 34 (shown in FIG. 2). When the native method returns, the execution engine 18 will continue executing the next instruction in the bytecode stream.

When the Java virtual machine 10 runs an application, it needs memory to store many items, including information it extracts from class files, objects that the program instantiates, parameters to methods, return values, local variables, and intermediate results of computations. The Java VM 10 organizes the memory it needs to execute a program into several runtime data areas, depicted in FIG. 2. These runtime areas may include a method area 24, a heap 26, one or more Java stacks 28, one or more program counter (PC) registers 30, and one or more native method stacks 32. Although the same runtime data areas exist in some form in every Java VM implementation, the structural details of these areas are left to the designers of the VM and may therefore vary considerably from one Java application to another.

Each instance of a Java VM 10 has one method area 24 and one heap 26. These areas are shared by all threads running inside the VM 10. As each thread comes into existence, it receives its own PC register 30 and Java stack 28. When the VM 10 runs a method contained in a thread, several things happen. First, the value of the PC register is used to tell the next instruction in the method's sequence to execute. Second, the thread's java stack 28 stores the state of each executing Java method in a stack frame, which includes the thread's local variables, the parameters with which it was invoked, its return value if any, and intermediate calculations. When the VM 10 has invoked a method in a thread and that method subsequently completes, the VM 10 discards the stack frame for that method from the Java stack 28. The state of native method invocations is stored in the native method stack 32 in a manner dictated by the designer of the Java VM 10.

Information about loaded data types are parsed from class files as they are loaded and stored in the method area 24. A data type refers to the format in which the data is expressed, e.g. an integer, a float, etc. A data type could also be an address of an op code within a method or a reference to an object on the heap 26. The VM 10 uses the type information stored in the method area 24 as it executes the application it is running.

For each data type the VM 10 loads, it should store the following kinds of information in the method area: (1) the fully qualified name of the type; (2) the fully qualified name of the type's superclass; (3) whether or not the type is a class or an interface; (4) the type's modifiers; (5) an ordered list of the fully qualified names of any direct superinterfaces; (6) the constant pool for the type; (7) field information; (8) method information; (9) all class variables declared in the type except constants; (10) a reference to class CLASSLOADER; and (11) a reference to class CLASS. Each of these kinds of information is well known to those in the art who design Java virtual machines and program in Java.

Figure 3:
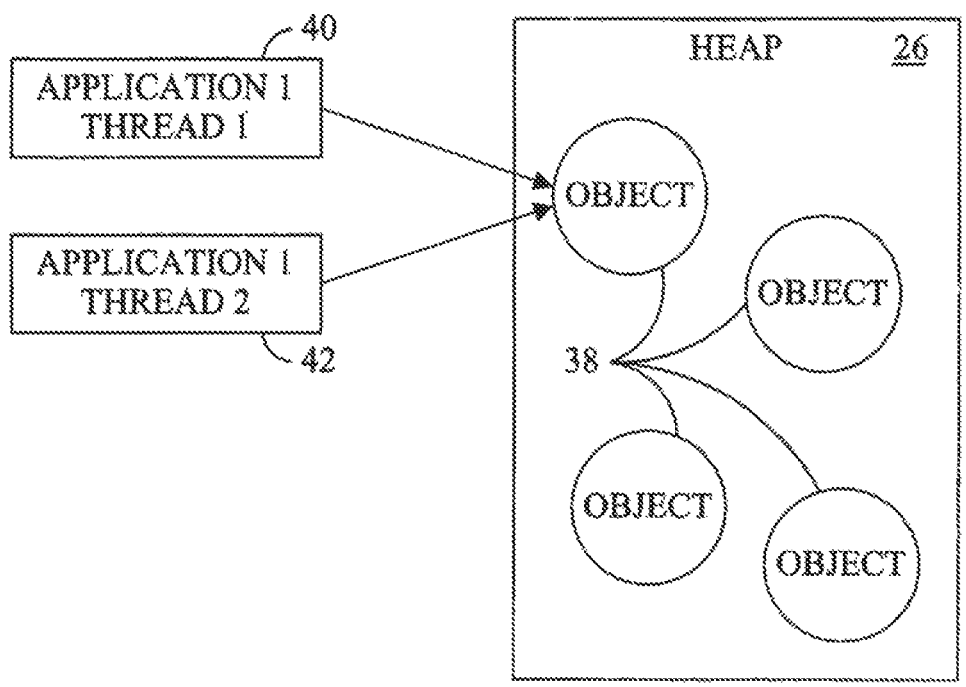
FIG. 3 is a schematic of the heap shown in FIG. 2.

Referring to FIG. 3, whenever an object 38 is created by a Java application, memory for the new object 38 is stored in the heap 26. Because there is only one heap 26 inside of any instance of a Java VM 10, all threads share the heap 26 and because each Java application runs inside its own Java VM 10, there is a separate heap 26 for every Java application running. In this manner, one Java application cannot affect the objects 38 in the heap 26 of another application. Two different threads 40 and 42 of the same application, however, could affect each other's heap data, i.e. the objects 38. For this reason, synchronization of the access to objects of multiple threads must be planned.

Figure 2:
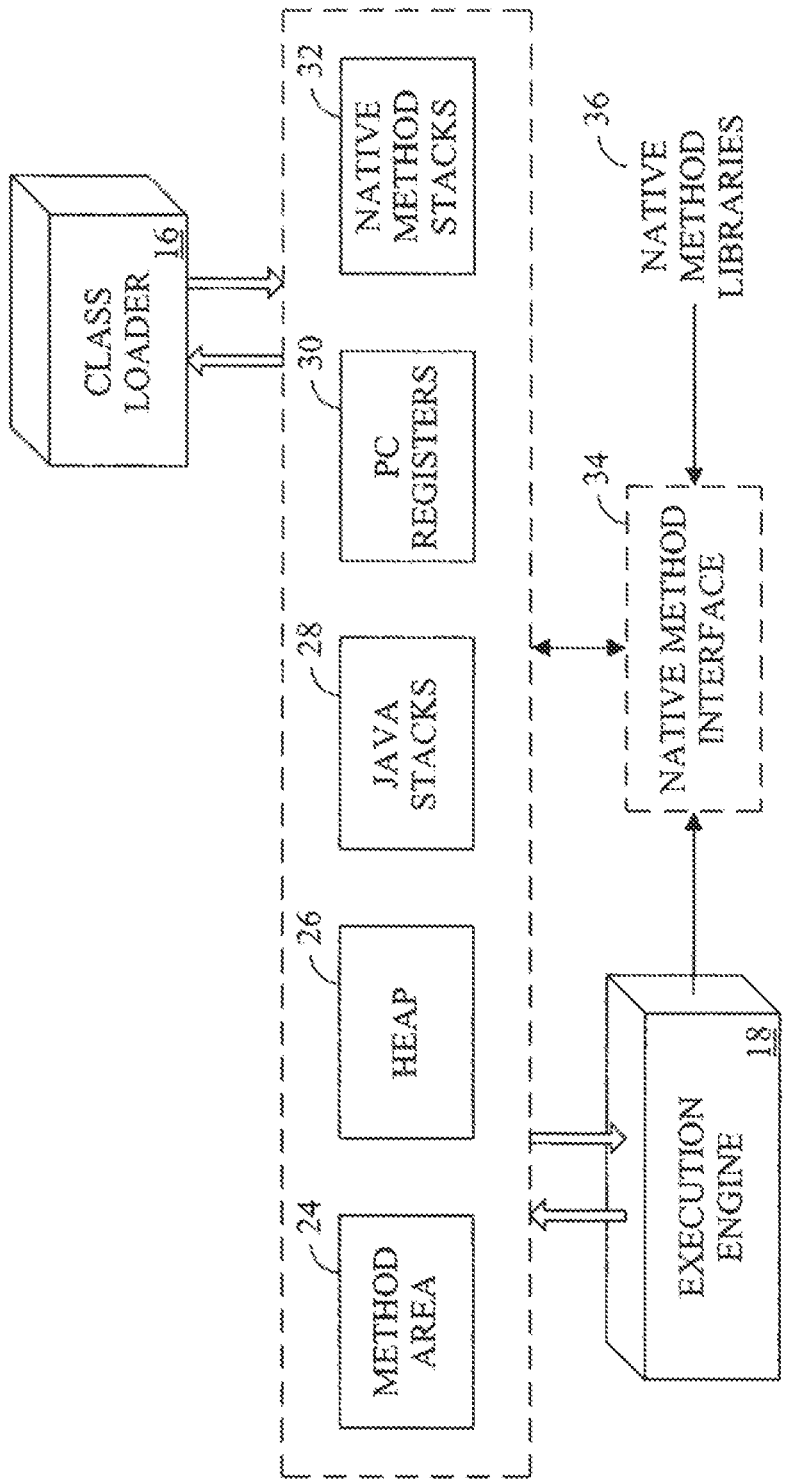
FIG. 2 is an expanded architectural schematic of the VM of FIG. 1 showing a memory region interposed between the class loader and the execution engine.
Figure 4A:
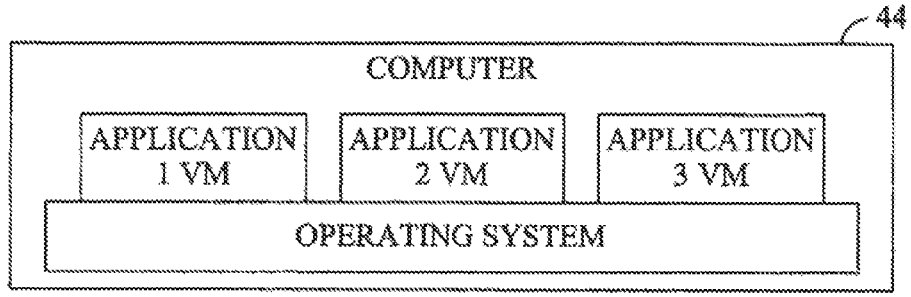
FIG. 4A is a diagram showing a prior art system for operating multiple VM applications on a host computer.
Figure 4B:
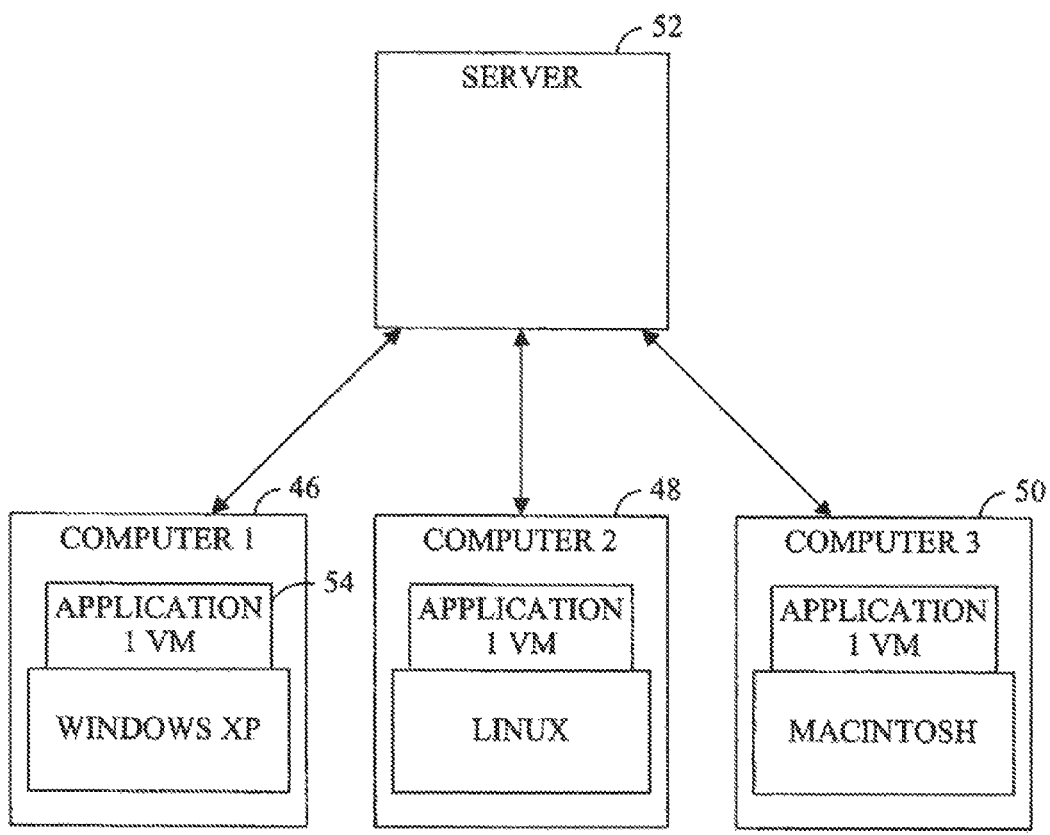
FIG. 4B is a diagram showing a prior art system for the simultaneous operation of multiple instances of a VM application on several host computers connected through a network or internet server.

The existing Java VM 10, as illustrated in FIGS. 1-3 has several disadvantages. First, it is inherently redundant. Referring to FIGS. 4A and 4B, a single computer when running multiple Java applications (or other applications that run in a VM) typically create a separate VM for each application. Each VM, in turn, generates its own method area, heap, PC register, etc., using a good deal of the resources of the underlying computer. This is true even when each VM is running a separate instance of the same application where many of the objects created by the application will be identical. This is illustrated in FIG. 4B where three computers 46, 48, and 50 are running the same application 54 through a server 52. In this instance, many of the runtime data areas may be located on the server 52, creating the same kind of redundancy as seen in FIG. 4A.

The redundancy of existing VM systems translates to a loss in system speed for two reasons. First, each VM must use its own resources, i.e. time, to load objects already loaded in other applications. Second, the combined memory space of all VM applications often bottlenecks system resources. In many cases, the speed at which an application or series of simultaneously running applications may operate defines the upper limit of a system's performance—the number of trades processed, web pages served, or billing records updated per second. In other words, the speed at which individually well-tuned processes can operate determines how much value that system can provide on a second-to second basis, i.e. lost system speed means lost revenue.

The existing wisdom is that the redundancy and the associated loss of speed that results from designing every VM application to run in its own isolated VM 10 is a small price in exchange for the assurance that one application cannot change or otherwise corrupt the data being used by another application. In addition, the isolation of applications each within its separate VM ensures that if one application should close, or suddenly crash, the other applications would remain unaffected. The present inventors, though, came to the realization that there are a variety of applications in which the sharing of data across applications might actually be beneficial. In those instances, the redundancy of the existing system for running VM applications and the associated loss of system speed would be needless.

Figure 5:
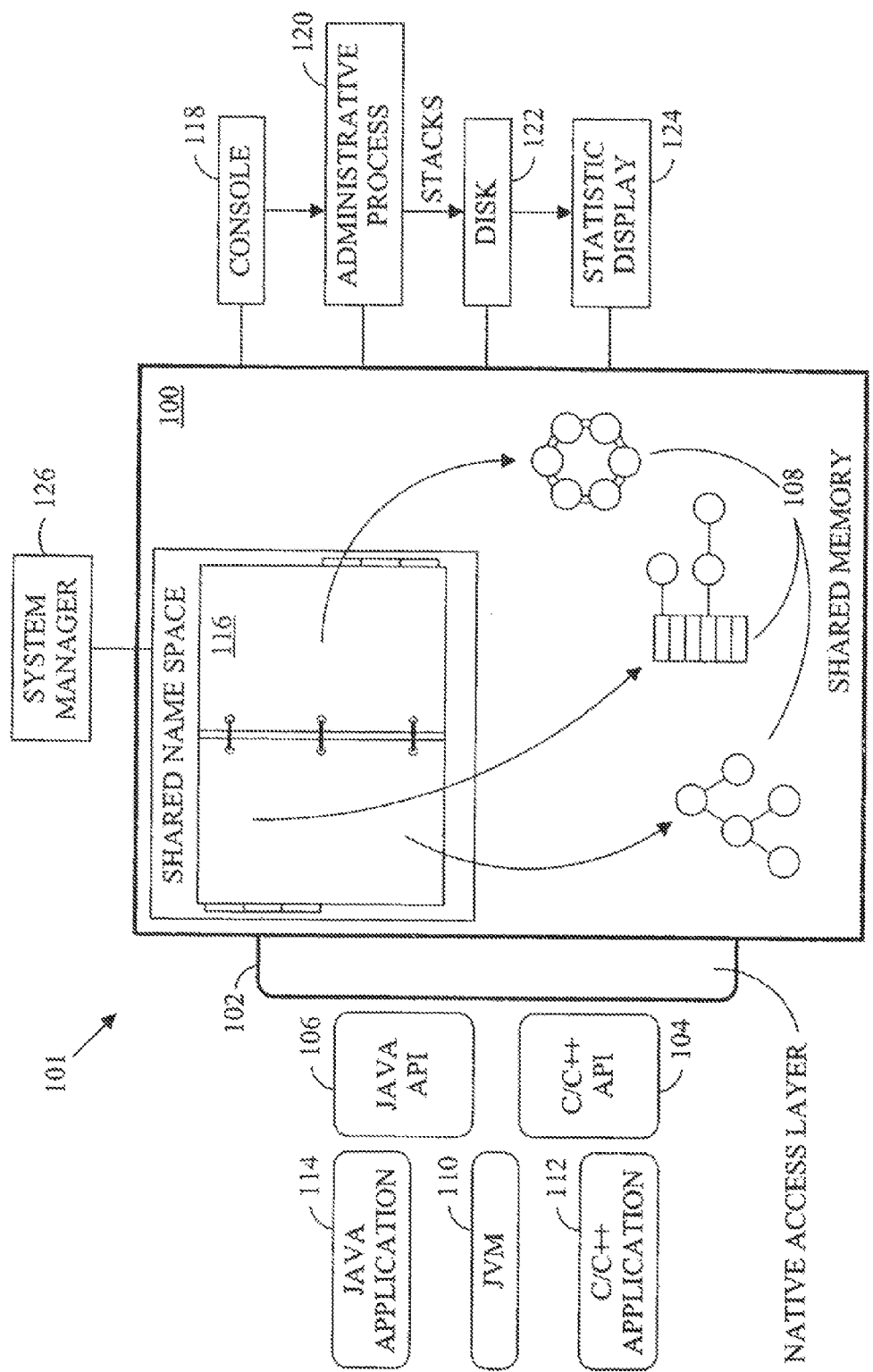
FIG. 5 is a diagram showing a first improved system for operating multiple VM applications on a host computer.

With this in mind, FIG. 5 shows an improved system for running VM applications, which broadly stated may comprise a shared object space 100 and a native access layer 102 operably connectable with a plurality of application programming interfaces (API) 104, 106 of independent VMs or other applications such as the C/C++ application 112. The access layer 102 permits each application 112, 114, through its associated, API 104, 106 to load objects 108 into the shared object space 100 where the objects 108 may be read and/or modified by the particular applications 112, 114. Although in some instances, the individual applications may duplicate some of the objects 108 stored in the shared object space 100 within its own respective heap or other memory area, the shared object space 100 permits an application to store an object 108 in the shared object space 100 instead of its own heap or other memory area, thus avoiding the redundancy of existing VM systems. Access to the objects 108 in the shared object space 100 may be synchronized for controlling access to shared objects in a heap by multiple concurrently running threads. Further, the shared object space 100 will store an object 108 so long as a thread of any connected application is using the object 108. In this manner, even if the application that placed a particular object in the shared object space 100 closes or crashes, that object will still be available to other applications as necessary. Thus the shared object space 100 permits multiple applications running simultaneously on a system or network to enjoy the stability of existing VM systems, while providing a substantial boost in performance.

The shared object space 100 is accessible to an application through the native access layer 102. Thus a Java application or other object oriented application will recognize the shared object space 100 as simply another resource accessible through the native methods interface that already exists in Java and other object-oriented applications. Once accessed, all the functionality of the shared object space 100 will be instantly accessible to the connected application. Further, the shared object space 100 does not need to be tied to a particular VM, but instead is backwards compatible with any individual VM, whether it is a standard Java VM provided by Sun Microsystems or a customized VM of a particular business, and forwardly compatible with any VM including improvements that have yet to be developed. Thus the versatility of the shared object space 100 can not be overstated. The versatility of the shared object space 100 is furthered by its compatibility with a wide variety of application interfaces. As can be seen in FIG. 5, the native access layer 102 provides access to the shared object space 100 by both Java applications and C or C++ applications. It should be understood that these examples are illustrative only, and that the native access layer 102 could provide access to the shared object space 100 by a number of other application types, whether object-oriented like Java or command oriented like C or C++.

The advantages of the shared object space 100 are readily apparent, particularly with respect to applications that benefit from the ability of multiple, simultaneously running applications to update a shared object rather than simply read or copy a shared object. One such application might be online trading. As the popularity of online trading increases, trading exchanges are faced with ever-growing volumes of market data and concurrent trader activity. Systems that were built to handle moderate volumes now have to handle thousands of traders and billions of dollars in daily transactions. Such systems have to accommodate huge spikes in demand. For instance, a single trade may require thousands of traders to be notified. Many traders watch for these price changes, then jump in to sell or buy very quickly, causing even more notification demand and more trading volume. The faster a trading system reacts to changes, the more transactions an exchange can execute, increasing its commissions while maximizing trader satisfaction with the service.

Another example of the utility of the shared object space 100 might be its potential in improving speed of computerized activity in the telecommunications industry. Modern telecommunication networks have to process vast amounts of data very quickly. Every time a call is placed, for example, an application needs to access the customer's subscription information, apply any special discounts that may be applicable, monitor the call duration and establish a rate based on the time and distance to the terminating number. Given that the number of such calls can run into the thousands at any given moment, a memory based data sharing facility is a necessity. In the past, such telecommunications applications have been written from scratch in C at enormous expense. The availability of an off-the-shelf shared memory component that provides a shared object space 100 makes it possible to write such systems in Java or another object-oriented program more quickly, cheaply, and with less risk.

Yet another example of the utility of the shared object space 100 is its potential use in large scale internet applications. Large internet content syndication and portal applications depend on fast caching for scalability. The shared object space 100 provides an ideal caching facility for HTML and XML fragments, XML DOMs and streams, HTTP session information, and JDBC query results. It can also hold very fast page request queues and other operational data structures. The shared object space 100 may include multi-language support which may be exploited when connected to web servers, servlet engines, content management suites, and XML transcoders to speed up every phase of a sites operation.

In use, the shared object space 100 may be one element in a larger computing system 101. Specifically, it is anticipated that the shared object space 100, along with its associated native access layer 102 may be used in conjunction with a console 118, an administrative processor 120, disk storage 122 and a display 124 suitable for displaying system statistics. The console 118 is used to configure and start the system 101 which may comprise a system manager 126, the shared object space 100, and the native access layer 102. The system manager 126 creates and initializes the shared object space 100, collects garbage, gathers statistics, and logs both system and user-defined events. Once the system 101 has been started, the system manager 126 can also be used to browse the shared object space 100, enable statistics collection from individual objects, and display the statistics graphically for analysis.

The system 101 is preferably stored on a disk 122 in a default directory, e.g. "defaultSystem", that holds the system's configuration file and log file. The system 101 may be included on an executable storage media such as a compact disk that include an installation tool that may be used to create the requisite directories on the disk 122. Additional custom system directories may also be installed on the same disk 122 as desired. Preferably, the system 101 includes a number of default tools that operate on the default system; however the console 118 and a command line utility may allow the user to specify a different system.

To make use of the system 101 and its shared object space 100, the system 101 includes a library file in the default directory. Java applications should include a reference to this library (e.g. productdir/lib/gemfire.jar) on its CLASSPATH. On Windows systems, the library may be made available by adding productDir/bin to PATH and on Solaris, the library can be made available by adding productDir/lib to LD_LIBRARY_PATH. An application process connects to the system 101 by making a call that contacts the system manager 126, such as GemFireConnection.myConn=GemFireConnection.getinstance("Gemfire"). The system manager 126 then returns information that enables the application process to map the shared object space 100 into its address space.

Each system 101 preferably maintains a global name space 116 in the shared object space 100. The name space 116 provides a fast object registry in which applications can register and look up "root" objects by name. Objects that are referenced from this name space are protected from garbage collection. Once connected to the system 101, an application can look up shared objects in the name space 116 with a command such as 3 Stock myStock=(Stock) myConn.lookup("GSI")

A shared object like myStock always represents a current shared value; that is all threads in all VMs always see the same field values, just as all threads in a single VM see the same volatile field values for an object in that VM. The statement myStock.getPrice( )

for example, might return the price most recently set by a local or remote thread, while the statement myStock.setPrice(34)

immediately updates the shared view of myStock's price. Because these fetches and updates incur no disk or network overhead, they are much faster than the same operations implemented through mechanisms like RMI and they outperform JDBC calls by an even wider margin.

The system 101 may include a Class Enhance tool that prepares an application class for sharing by modifying the class's bytecodes to provide transparent instantiation in shared memory and automatic read-through and write-through for field access methods. By default, all fields may be shared, but a user may establish more selective policies by providing an XML description of the fields to be shared in each domain class. Once a class is enhanced, making an object of that class automatically puts the object into shared memory.

Figure 6:
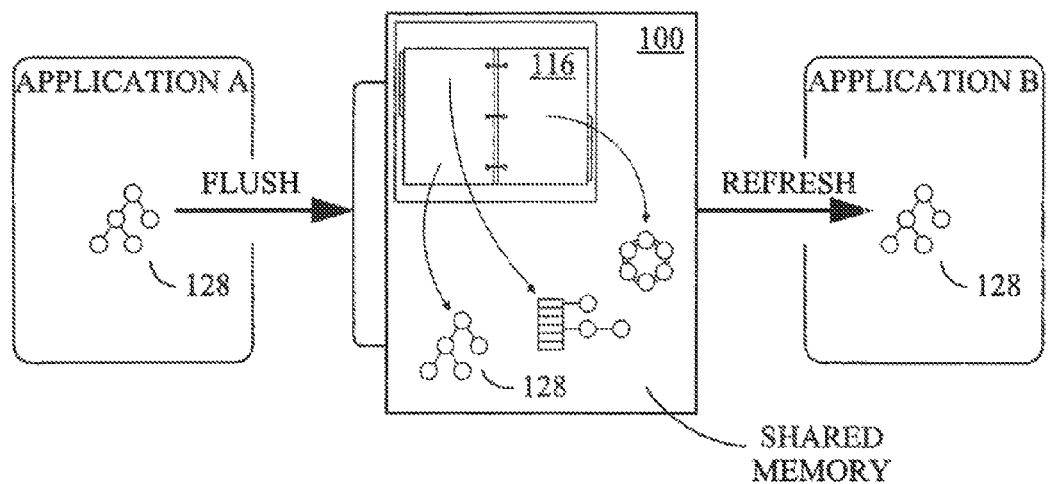
FIG. 6 is a diagram showing a first manner in which objects may be shared between applications using the system of FIG. 5
Figure 7:
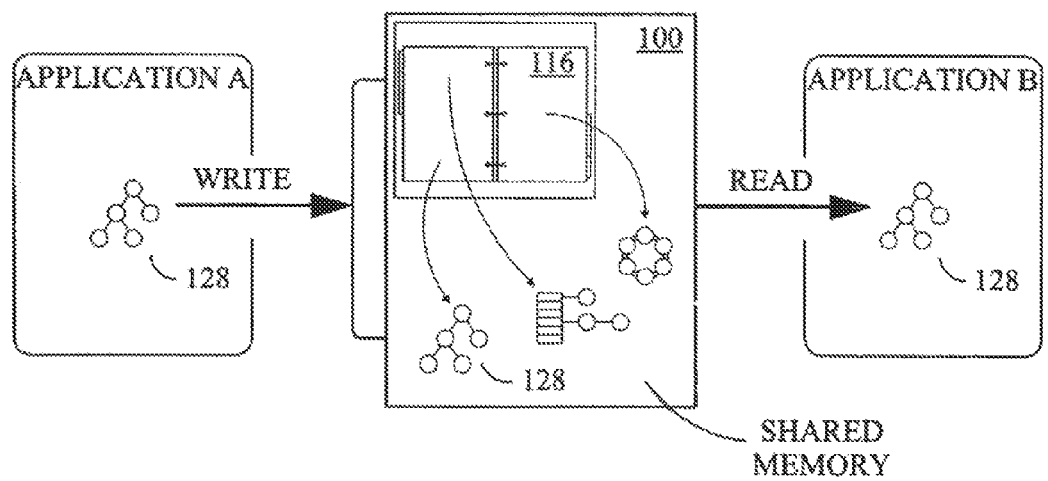
FIG. 7 is a diagram showing a second manner in which objects may be shared between applications using the system of FIG. 5

Referring to FIGS. 6 and 7, the system 101 may support two methods of sharing objects, copy sharing and direct sharing. An object 128 that is copy shared is allocated twice, once in the local memory of an application and again in shared memory 100. FIG. 6 shows an example of a copy sharing method where application A creates an object 128 in its local address space. The object 128 is shared by putting it into the shared name space 116. At this point, the object 128 is not immediately written to a field in the shared object space 100; instead the object 128 is written to shared memory 100 only after a user "flushes", i.e. updates the object to a new version, for the first time. Once an object 128 is written to shared memory, application B is able to copy the object 128 to its local memory by accessing the shared object 128 by name in the shared name space 116. Application B may modify the copy of the object 128 obtained from shared memory, and may also flush to update the shared memory copy of the object. If application B wishes to see the most recently updated version of the object 128, a refresh command may be used.

FIG. 7 shows an example of a direct sharing method, which is a one-space model where some of all of the non-static fields of the shared object 128 reside only in shared memory. Static fields may be kept in the local heap of an application's VM for performance reasons. An assignment to a field of a directly shared object 128 is immediately visible to threads of other applications and each application is able to write to the shared object. When the field is read, the current state in shared memory 100 is returned; there is no need to refresh the local memory.

Figure 8:
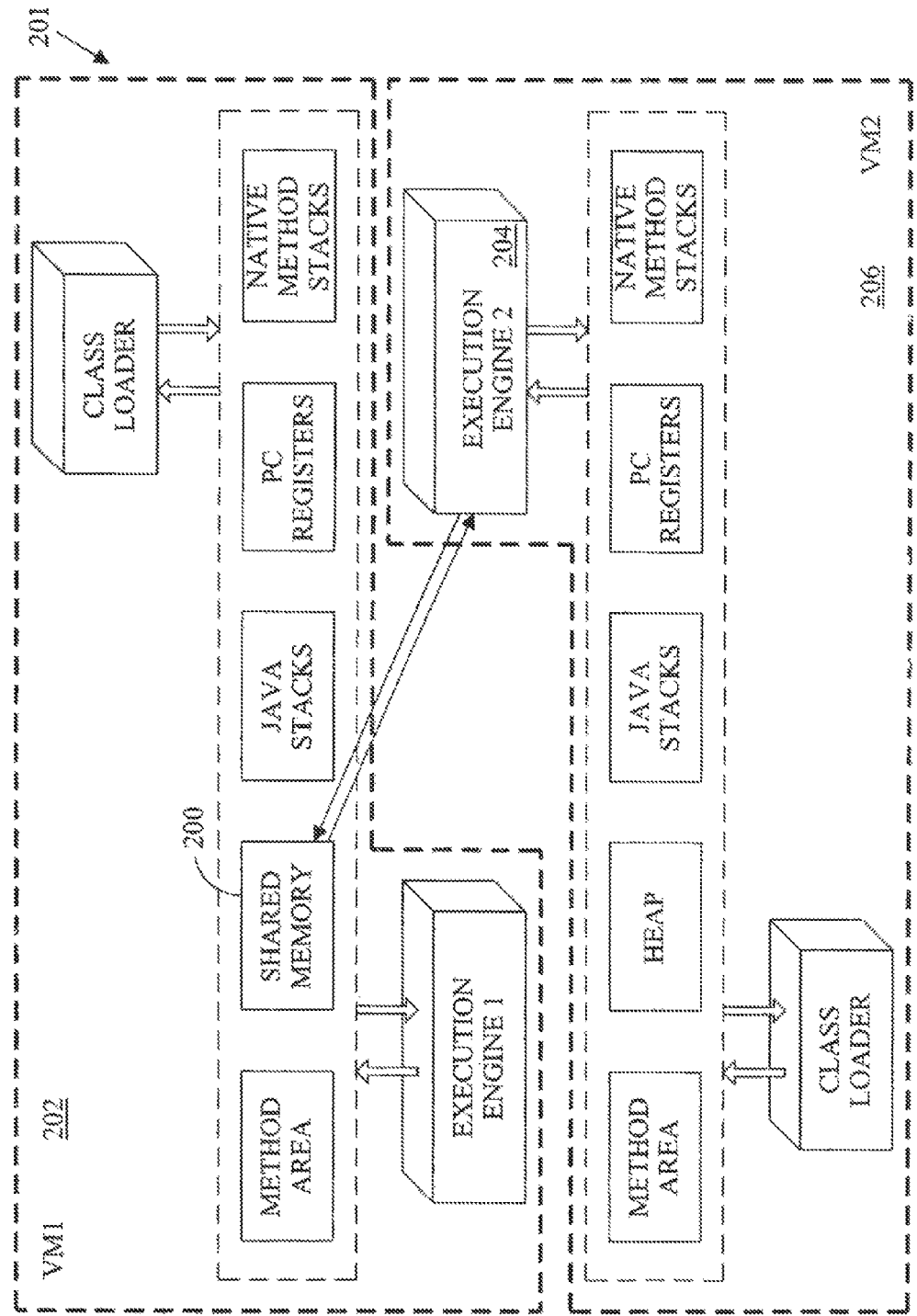
FIG. 8 is a second improved system for operating multiple VM applications on a host computer.

FIG. 8 shows another system 201 that includes a shared object space 200 within a first Java VM 202. The first Java VM 202 may include all the elements of a typical Java VM as previously described, i.e. a method area, a class loader, an execution engine, etc. The heap of the first Java VM, however, acts as the shared object space 200 so as to be accessible by the execution engine 204 of a second Java VM. In the system 201, the first instance of an application may initiate a VM whose heap performs as a shared object space for subsequent instances of applications operating on the same computer.

The shared object space 200 may have all the functionality of the shared object space 100 previously described.

Figure 9:
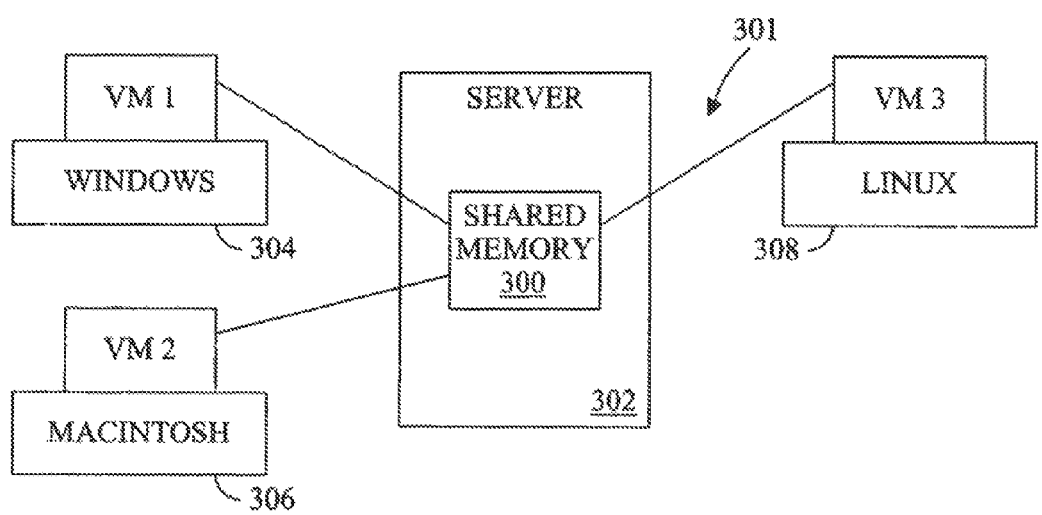
FIG. 9 is an improved system for the simultaneous operation of multiple instances of a VM application on several host computers connected through a network or internet server.

FIG. 9 shows another system 301 in which a shared object space 300 resides on a server 302 interconnecting independent computers 304, 306, 308 operating on the same or different platforms. Each computer 304, 306, and 308 is running a VM instance of a single application that reads and/or writes to data in a database on the server 302. For example, the server 302 may include a dynamic database for stock prices in a trading scenario where the connected computers 304, 306, and 308 may be used to complete stock transactions through the server using a uniform software package.

Figure 10A:
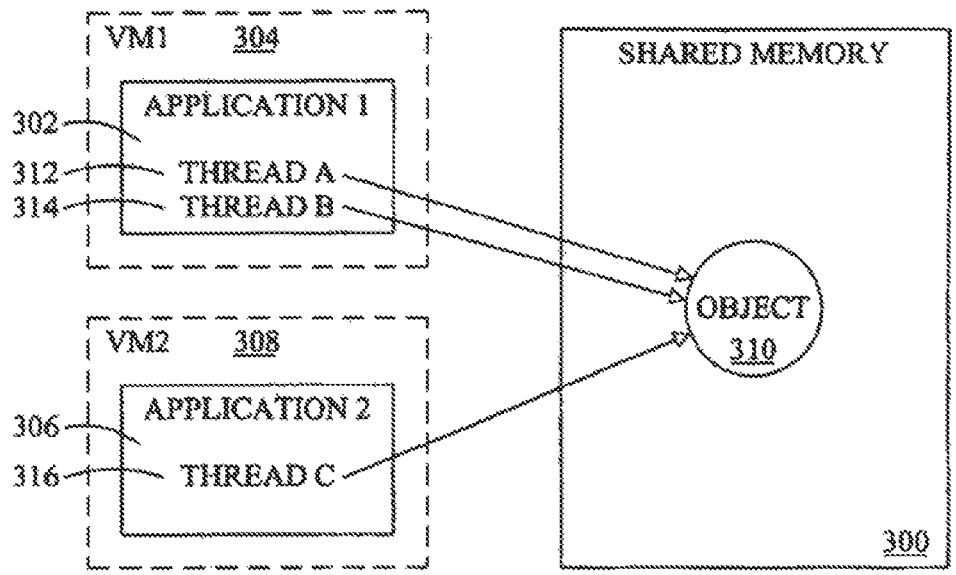
FIGS. 10A and 10B show a system for synchronizing locks on objects shared in a shared object space.

As stated previously, when multiple threads from multiple applications are sharing objects in a shared object space, access to the objects should be synchronized. FIG. 10A illustrates this necessity. In this figure, application 302 is running in a VM 304 while application 306 is running in another VM 308. Both VM 304 and VM 308 are sharing the shared object space 300 that is storing a shared object 310. In this figure, application 302 is simultaneously running two threads, thread 312 and thread 314, both of which are calling shared object 310. At the same time, application 308 is running a thread 316 which also is calling the shared object 310. Absent synchronization, each thread 312, 314, and 316 could all access the shared object and make simultaneous, possibly conflicting changes to the object 310 without any knowledge of each other's changes.

Also, as stated previously, existing methods provide for synchronization of multiple threads in a single application accessing a shared object in a single VM. Extended synchronization techniques, as described herein, may be used to provide synchronization for concurrent access to objects in shared memory by multiple applications illustrated in FIG. 10B.

Figure 10B:
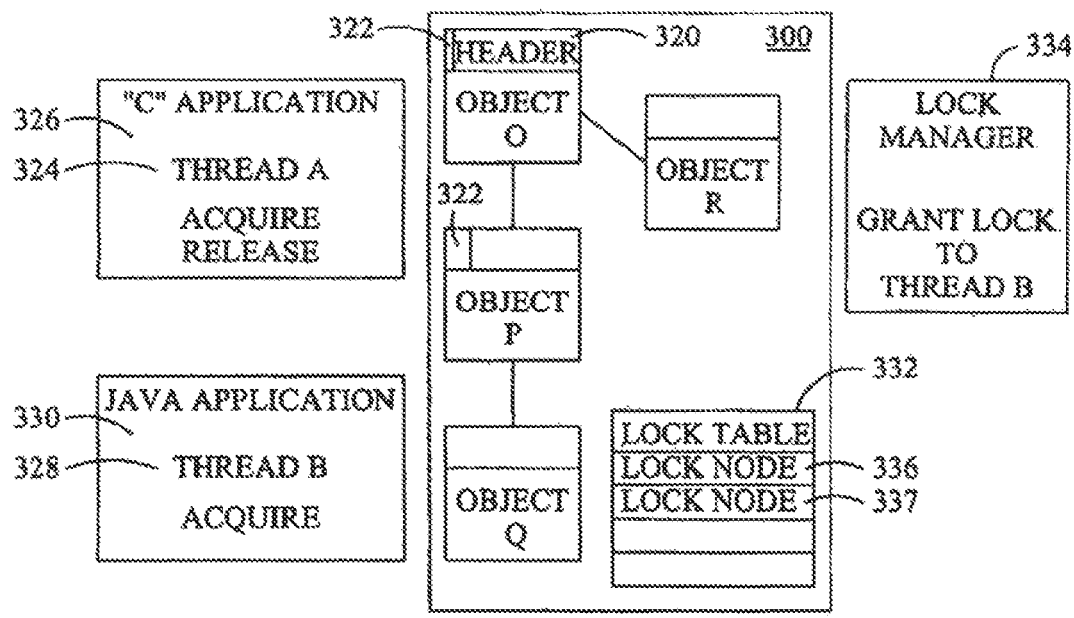

In FIG. 10B, a shared object space 300 stores objects O, P, Q, and R. Each of these objects includes an object header 320. Each object header 320 may include a lock info field 322 which is used to indicate whether a thread of an application has locked that object. The lock info field 322 may contain either a "cheap lock" or a reference to a "lock node", i.e. an "expensive lock." A "cheap lock" directly encodes the identity of the application and the thread that owns the lock by inserting a value into the lock info field 322 unique to the thread of that application. (The value "0" may be used to indicate that an object is not locked by any thread of any application.) When thread A of application 326 seeks to acquire object O, for example, thread A checks the header of object O to test whether the value in the lock info field 322 is "0", representing that it is not locked. If the value is "0" then thread A 324 substitutes its unique number in the header of object O and acquires the lock with a "cheap lock."

This compare and swap informs subsequent threads that wish to acquire object O that the object is "locked" and these threads will wait. This compare and swap is preferably "atomic" in nature, meaning that the issued command(s) is performed in such a manner that there is no potential for another thread to lock the object in the interim, especially when the command is executed by the processor. In many cases, the swap is performed in a manner internal to the microprocessor, and is accordingly a very efficient mechanism. For example, if thread B 328 seeks to acquire the object O while thread A 324 already has it, thread B will test to see whether the lock info field 322 is "0". The test will fail and thread B will recognize that thread A has the object because of the number in the header. At this point, thread B does several things. Thread B makes two entries in a lock table 332 called "lock nodes" 336 and 337. Also, thread B updates the "cheap lock" of the lock info field 322 to an "expensive lock" that contains a reference to the lock node 336 in the lock table 332. Thread B then goes to sleep waiting on its lock node 336. When thread A is finished it notifies the lock manager 334 which removes the lock node 336 from the lock table and swap's B's "expensive lock". i.e. a reference to the lock node 337, into the lock info field 322 of the object's header. Thread B thereby gains control of the object.

A lock node, such as 336 and 337, is an internal object, not visible to the application. When a lock node is created, it is added to the lock table 332. If a thread of an application wanting to acquire the lock must wait for another thread to release the lock, it waits on the unique lock node object representing its lock request. The lock table 332 holds instances of lock nodes. A given lock node in the table represents either a thread that currently holds a lock or a thread that is waiting to acquire a lock. The lock node contains information pertaining to the virtual machine that has or wants the object, as applicable, the thread that has or wants the object, as applicable, and the object had or wanted, as applicable. When the lock manager 334 successfully grants a lock to a thread by setting the target object's lock info field 322 to be a reference to the lock node representing the waiting thread, using the compare and swap technique, it signals the lock node. The waiting thread then gets the object and proceeds.

All of the aforementioned activities of thread B occur without any effect on thread A. Stated differently, thread A is unaware of anything that B is doing and hence is not slowed down by thread B's activities. When thread A is finished and seeks to release the lock on object O it will check the lock node 336 and see that there are one or more threads waiting for access to the object O. A first assumes that the lock is still a "cheap lock" and does a compare and swap. If the lock has been updated to an expensive lock, its value is no longer in the lock info field, so the test and swap will fail. In that case, two implementations might occur.

In the first implementation, the object's lock info field is set to "0" and the lock manager is signaled that there may be another lock node in the lock table that can be granted the lock. (This is generally faster for the application thread). The lock manager 334 will then consult the lock table to see which thread has priority, in this case thread B, and therefore grant thread B access to object O, at which point thread B's "expensive lock" will be inserted in the header of object O, etc. The second implementation is that the thread, i.e. A, does the work of determining the next owner of the lock and atomically changes the object's lock info field 322 from a reference to its lock node to a referenced to the next owner's lock node. This eliminates the need for a lock manager, at the expense of making the application slower.

The following is an example of a Java program fragment that might be used to invoke the procedures described above:

4 Lockservice.synchronize (anObject,new Runnable ( ){Lockservice.notify (anObject); Lockservice.wait (anobject);});

The following is an example of a C fragment that may be used to invoke the procedures described above:

5 Status=gfacquireLock(employee) doWork gfReleaseLock(employee)

The foregoing examples illustrate the process that would occur if two threads were contending for access to the same object. The foregoing examples also illustrate the language neutrality and interoperability of the disclosed system. Obviously there may be quite a few threads seeking access to an object simultaneously, and in that event the foregoing procedure will control the priority of access in an orderly fashion through the lock table 332 which records the relative priority of access to an object between multiple threads. In the foregoing example, access to an object by multiple threads is granted in order of the requests, i.e. first come, first served. Other systems may be used. For example, some systems may provide for threads to be indicated as priority threads whose function is of some critical importance, and their place in the lock table accordingly bumped up. In some cases there is no guarantee to priority of access, so that if threads B. C. and D all try to obtain a lock while thread A has it, thread B may not be next in line even if it were the first to try to obtain the lock with respect to threads C and D.

The advantage of the foregoing system is a considerable boost in speed. For example, when there is no contention for an object at the time a thread is trying to acquire it, the object may be obtained by a thread in as little as 10 microseconds. Where there is contention, however, it may take more than 100 microseconds to acquire the object after it has been released. Thus the ability to quickly detect whether or not there is contention for an object permits a thread to acquire the object by the quicker method.

FIG. 10B shows that object O is the parent of objects P and R and object P is the parent of object Q. Objects O, P, Q, and R each have headers with a lock info field 332. Therefore, threads are able to obtain object Q, for example, without needing to lock any of the other objects, freeing them for use by other threads.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method comprising:
receiving, by a computer system, a request from a first application executing on the computer system, the request indicating that the first application seeks access to an object stored in a shared object space, the shared object space including a memory space configured to store one or more data objects accessible by the first application and by a second application executing concurrently with the first application, the object having a header;
determining, while processing the request, by the computer system, that the second application is accessing the object, the determining including obtaining from the header of the object a reference to a portion of a lock table that stores an identifier of the second application, the lock table being a data structure associated with the object and configured to store identifiers of applications seeking access to the object or currently accessing the object;
upon receiving a notification from the second application indicating that the second application has finished accessing the object, by the computer system:
modifying the lock table, including removing the identifier of the second application from the lock table; and
modifying the header of the object, including storing, as a replacement of the reference currently stored in the header, a reference to a portion of the lock table that stores an identifier of the first application; and, after modifying the lock table and modifying the header,
allowing the first application to access the object in response to the received request.

2. The method of claim 1, wherein at least one of the first application or second application is running in a virtual machine.

3. The method of claim 1, wherein, the first application and second application each load a library that provides commands to transmit requests to connect to the shared object space and to access the object stored in the share object space.

4. The method of claim 1, wherein each of the first application and the second application looks up the object in the shared object space using a global name space.

5. The method of claim 1, wherein determining that the second application executing on the computer system is accessing the object comprises testing a lock corresponding to the object to determine whether the lock is free.

6. The method of claim 5, further comprising, upon determining that the lock is not free, inserting the identifier of the first application as an entry in the lock table, wherein the entry indicates that the first application is waiting to acquire the lock.

7. The method of claim 1, further comprising:
upon determining that the second application executing on the computer system is accessing the object, designating the first application to execute in a sleep mode in which the first application waits for the second application to finish accessing the object; and
notifying the first application when the object is free.

8. A non-transitory computer-readable storage medium storing instructions that, when executed by a computer system, cause the computer system to provide synchronized access to data objects accessible to a plurality of concurrently running applications in the computer system by performing operations comprising:
receiving a request from a first application executing on the computer system, the request indicating that the first application seeks access to an object stored in a shared object space, the shared object space including a memory space configured to store one or more data objects accessible by the first application and one or more second applications executing concurrently with the first application;
determining, while processing the request, by the computer system, that the second application is accessing the object, the determining including obtaining from the header of the object a reference to a portion of a lock table that stores an identifier of the second application, the lock table being a data structure associated with the object and configured to store identifiers of applications seeking access to the object or currently accessing the object;
upon receiving a notification from the second application indicating that the second application has finished accessing the object:
modifying the lock table, including removing the identifier of the second application from the lock table; and
modifying the header of the object, including storing, as a replacement of the reference currently stored in the header, a reference to a portion of the lock table that stores an identifier of the first application; and then
allowing the first application to access the object in response to the received request.

9. The non-transitory computer-readable storage medium of claim 8, wherein at least one of the first application or second application is running in a virtual machine.

10. The non-transitory computer-readable storage medium of claim 8, wherein, the first application and second application each load a library that provides commands to transmit requests to connect to the shared object space and to access the object stored in the share object space.

11. The non-transitory computer-readable storage medium of claim 8, wherein each of the first application and the second application looks up the object in the shared object space using a global name space.

12. The non-transitory computer-readable storage medium of claim 8, wherein determining that the second application executing on the computer system is accessing the object comprises testing a lock corresponding to the object to determine whether the lock is free.

13. The non-transitory computer-readable storage medium of claim 12, the operations comprising:
upon determining that the lock is not free, inserting the identifier of the first application as an entry in the lock table, wherein the entry indicates that the first application is waiting to acquire the lock.

14. The non-transitory computer-readable storage medium of claim 8, the operations comprising:
upon determining that the second application executing on the computer system is accessing the object, designating the first application to execute in a sleep mode in which the first application waits for the second application to finish accessing the object; and
notifying the first application when the object is free.

15. A computer system comprising:
a processor; and
a non-transitory computer-readable storage medium storing instructions that, when executed by the processor, cause the computer system to perform operations comprising:
receiving a request from a first application executing on the computer system, the request indicating that the first application seeks access to an object stored in a shared object space, the shared object space including a memory space configured to store one or more data objects accessible by the first application and one or more second applications executing concurrently with the first application;
determining, while processing the request, by the computer system, that the second application is accessing the object, the determining including obtaining from the header of the object a reference to a portion of a lock table that stores an identifier of the second application, the lock table being a data structure associated with the object and configured to store identifiers of applications seeking access to the object or currently accessing the object;
upon receiving a notification from the second application indicating that the second application has finished accessing the object:
modifying the lock table, including removing the identifier of the second application from the lock table; and
modifying the header of the object, including storing, as a replacement of the reference currently stored in the header, a reference to a portion of the lock table that stores an identifier of the first application; and then
allowing the first application to access the object in response to the received request.

16. The computer system of claim 15, wherein at least one of the first application or second application is running in a virtual machine.

17. The computer system of claim 15, wherein, the first application and second application each load a library that provides commands to transmit requests to connect to the shared object space and to access the object stored in the share object space.

18. The computer system of claim 15, wherein each of the first application and the second application looks up the object in the shared object space using a global name space.

19. The computer system of claim 15, wherein determining that the second application executing on the computer system is accessing the object comprises testing a lock corresponding to the object to determine whether the lock is free.

20. The computer system of claim 19, wherein the operations comprise upon determining that the lock is not free, inserting the identifier of the first application as an entry in the lock table, wherein the entry indicates that the first application is waiting to acquire the lock.

* * * * *